(12) United States Patent
Hong et al.

(10) Patent No.: US 11,240,656 B2
(45) Date of Patent: Feb. 1, 2022

(54) METHOD FOR CONTROLLING DISPLAY OF SIM CARD FUNCTION MENU AND STORAGE DEVICE FOR THE SAME

(71) Applicant: JRD COMMUNICATION (SHENZHEN) LTD., Shenzhen (CN)

(72) Inventors: Yangning Hong, Shenzhen (CN); Donghai Wu, Shenzhen (CN); Hanwu Xie, Shenzhen (CN); Zubin Chen, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 16/880,982

(22) Filed: May 21, 2020

(65) Prior Publication Data

US 2020/0288299 A1 Sep. 10, 2020

Related U.S. Application Data

(63) Continuation of application No. PCT/CN2018/119768, filed on Dec. 7, 2018.

(30) Foreign Application Priority Data

Dec. 8, 2017 (CN) .......................... 201711316331.6

(51) Int. Cl.
*H04W 8/18* (2009.01)
*G06F 3/0482* (2013.01)
*H04B 1/3816* (2015.01)

(52) U.S. Cl.
CPC .......... *H04W 8/183* (2013.01); *G06F 3/0482* (2013.01); *H04B 1/3816* (2013.01)

(58) Field of Classification Search
CPC ..... H04W 12/71; H04W 12/72; H04W 8/205; G06Q 20/3229
See application file for complete search history.

(56) References Cited

U.S. PATENT DOCUMENTS

| 10,708,761 B1* | 7/2020 | Yin ........................ H04W 8/183 |
| 2009/0020602 A1* | 1/2009 | Pratone .................. H04W 88/02 235/380 |

(Continued)

FOREIGN PATENT DOCUMENTS

| CN | 1345154 A | 4/2002 |
| CN | 1913690 A | 2/2007 |

(Continued)

OTHER PUBLICATIONS

International search report,PCT/CN2018/119768, dated Feb. 27, 2019 (3 pages).

(Continued)

*Primary Examiner* — Dung Hong

(57) ABSTRACT

The present disclosure provides a method of controlling a display of a SIM card function menu, the method including: uninstalling a default function module in a system corresponding to a preset function; determining whether a preset command corresponding to a preset function is received from the SIM card; when the preset command from the SIM card corresponding to the preset function is received, loading a function module in the SIM card corresponding to the preset function and displaying a menu corresponding to the preset function. The present disclosure further provides a device having a storage function.

8 Claims, 2 Drawing Sheets

(56) References Cited

U.S. PATENT DOCUMENTS

| | | | |
|---|---|---|---|
| 2013/0184029 A1* | 7/2013 | Lim | H04W 4/021 455/551 |
| 2013/0294602 A1* | 11/2013 | Huxham | H04W 12/02 380/255 |
| 2015/0189496 A1 | 7/2015 | Park et al. | |
| 2016/0020804 A1* | 1/2016 | Lee | H04W 8/205 455/558 |
| 2016/0105540 A1* | 4/2016 | Kwon | H04N 21/4312 715/747 |
| 2016/0135048 A1* | 5/2016 | Huxham | H04W 12/06 455/411 |
| 2017/0124543 A1 | 5/2017 | Wang | |
| 2017/0164184 A1* | 6/2017 | Borse | H04L 67/306 |
| 2019/0007824 A1* | 1/2019 | Jolibois | H04W 8/183 |

FOREIGN PATENT DOCUMENTS

| | | | | |
|---|---|---|---|---|
| CN | 1946235 A | 4/2007 | | |
| CN | 101834932 A | 9/2010 | | |
| CN | 104653340 A | 6/2015 | | |
| CN | 105516958 A | 4/2016 | | |
| CN | 106155495 A | 11/2016 | | |
| CN | 108156312 A | 6/2018 | | |
| WO | WO-2016169105 A1 * | 10/2016 | | G06F 3/048 |

OTHER PUBLICATIONS

First Office Action from China patent office in a counterpart Chinese patent Application 201711316331.6, dated Dec. 26, 2019 (10 pages).
Second Office Action from China patent office in a counterpart Chinese Patent application No. 201711316331.6, dated Aug. 20, 2020 (5 pages).

* cited by examiner

METHOD FOR CONTROLLING DISPLAY OF SIM CARD FUNCTION MENU AND STORAGE DEVICE FOR THE SAME

CROSS REFERENCE

The present application is a continuation-application of International (PCT) Patent Application No. PCT/CN2018/119768, filed on Dec. 7, 2018, which claims foreign priority of Chinese Patent Application No. 201711316331.6, filed on Dec. 8, 2017, in the National Intellectual Property Administration of China, the entire contents of which are hereby incorporated by reference in its entirety.

TECHNICAL FIELD

The present disclosure relates to the field of communications and, in particular, to a method for controlling a display of a SIM card function menu and to a storage device for the same.

BACKGROUND

A small software in programming language with a function similar to STK is solidified in some SIM (SIM Tool Kit) card, such that the SIM card may run their own applications. Some functions are commonly used on mobile phones, and the mobile phones have a corresponding function entry menu. For example, the function entry menu of the STK function is a SIM card toolkit for a user-friendly business operation. However, some SIM cards support the functions, whereas some SIM cards do not. Therefore, when a SIM card does not support the functions, the function menu of a terminal may bring a poor user experience, and occupy more space.

SUMMARY OF THE DISCLOSURE

According to the present disclosure, a technical scheme is to provide a method for controlling a display of a SIM card function menu, including:

Uninstalling a default function module in a system corresponding to a preset function;

Determining whether a preset command corresponding to a preset function is received from the SIM card;

When the preset command corresponding to the preset function is received from the SIM card, loading a function module in the SIM card corresponding to the preset function and displaying a menu corresponding to the preset function.

According to the present disclosure, another technical scheme is to provide a method for controlling the display of the SIM card function menu, including:

Determining whether a preset command corresponding to a preset function is received from the SIM card;

When the preset command corresponding to the preset function is received from the SIM card, uninstalling a default function module corresponding to the preset function.

According to the present disclosure, another technical scheme is to provide a device having a storage function. The storage device may store a program data, and the program data may be executed to achieve the method mentioned above.

BRIEF DESCRIPTION OF THE DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

Referring to the accompanying drawings, the embodiments of the present disclosure will be described. With consideration of clarity and brevity, the function and construction of public knowledge will not be described in detail. The terms described below may be qualified by the functions mentioned in the present disclosure, and may vary according to the intent or implementation of users and operators. Therefore, the terms should be qualified on the basis of the disclosure of the entire specification.

Figure 1:
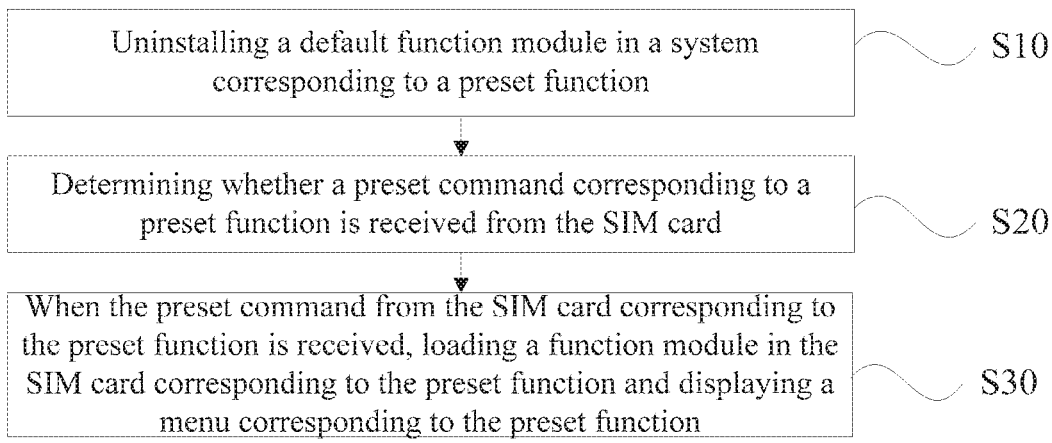
FIG. 1 is a flow schematic view of a method for controlling a display of a SIM card function menu according to an embodiment of the present disclosure.

Referring to FIG. 1, FIG. 1 is a flow schematic view of a method for controlling a display of a SIM card function menu according to an embodiment of the present disclosure. The method may include operations at blocks illustrated in FIG. 1.

At block S10: a default function module in a system corresponding to a default function is uninstalled.

Alternatively, the default function module corresponding to the preset function may be uninstalled after the system is started. The default function module refers to a collection of program elements such as data descriptions, executable statements, being configured to achieve a preset function. The default function module may be stored in a terminal system and correspond to the preset function by default.

Alternatively, the preset function is a function corresponding to a preset command sent by the SIM card, wherein the operation of block S10 is to uninstall the default function module corresponding to the preset function.

Alternatively, an operation for the system to uninstall the default function module corresponding to the preset function may include, that the system uninstalls the default function module corresponding to the preset function immediately after the system is started.

In an embodiment, after the system is started, the system immediately uninstalls the default function module corresponding to the preset function in the system, including deleting the menu corresponding to the preset function.

In another embodiment, after the system is started, the system is determined whether to have loaded the default function module corresponding to the preset function. In response to the system loading the default function module corresponding to the preset function, the default function module corresponding to the preset function is uninstalled.

At block S20: Whether a preset command corresponding to the preset function is received from the SIM card, is determined.

Alternatively, the preset command may be an active command being actively sent by the SIM card, and the SIM card may send the preset command along with a data packet of a function module corresponding to the preset command.

In an embodiment, the operation of block S20 is operated after the default function module corresponding to the preset function is uninstalled according to the operation of block S10, and whether the preset command corresponding to the preset function is received from the SIM card, is further determined.

In another embodiment, during performing the operation of block S20, the determination of whether the preset command corresponding to the preset function is received from the SIM card, is operated along with the determination of whether the data packet of the function module corresponding to the preset command is received.

Alternatively, the preset command is an active command sent by the SIM card. That is, the preset command is an active command sent by the SIM card after the system is started.

In an embodiment, the preset function is an STK function. After the system is started, the SIM card supporting the STK function may send the preset command to the system, wherein the preset command is an active command sent by the SIM card.

At block S30: When the preset command from the SIM card corresponding to the preset function is received, the function module in the SIM card corresponding to the preset function is loaded.

Alternatively, when a result of the determination according to the operation of block S20 is yes, that is, when the preset command corresponding to the preset function is determined to be received from the SIM card in the operation of block S20, the function module in the SIM card corresponding to the preset function is loaded.

Alternatively, the function module in the SIM card corresponding to the preset function may be a collection of program elements such as data descriptions and executable statements, being solidified in the SIM card and configured to achieve the preset function. The collection of the program elements may be sent to the system when the active command corresponding to the preset function is sent from the SIM card. The function module may be a data collection of the program elements such as data descriptions and executable statements, being configured to achieve the preset function, and also may be a data packet.

In an embodiment, when the preset command corresponding to the preset function is received from the SIM card, the data packet of the function module corresponding to the preset function is loaded, wherein the data packet of the function module corresponding to the preset function is sent along with the preset command from the SIM card.

In another embodiment, when no preset command corresponding to the preset function is received from the SIM card, the SIM card is determined not to support the preset function and the procedure is terminated.

Alternatively, the data packet of the function module corresponding to the preset function may be sent from the SIM card to the system or solidified in the SIM card.

In an embodiment, the data packet of the function module corresponding to the preset function is sent along with the preset command corresponding to the preset function from the SIM card.

In another embodiment, the data packet of the function module corresponding to the preset function is sent to the system after the preset command is sent from the SIM card, and after the operation of block S20.

In another embodiment, the loaded data packet of the function module corresponding to the preset function may be a data packet solidified in the SIM card. After the operation of block S30 is triggered, the system loads the data packet of the function module solidified in the SIM card corresponding to the preset function. The data packet of the function module corresponding to the preset function may not be required to be sent to the system, whereas the data from the data packet solidified in the SIM card may be directly loaded.

Alternatively, the preset function may include the STK function. The preset function may also include other functions corresponding to the active command sent by the SIM card, which will not be repeated here.

Alternatively, in the operation of block S30, after the function module in the SIM card corresponding to the preset function is loaded, the menu corresponding to the preset function is displayed.

In an embodiment, when the preset function is the STK function, the preset command corresponding to the preset function is a command of SET UP MENU, being actively sent by the SIM card. After the system is started, the default function module corresponding to the STK function is uninstalled, and the default command corresponding to the STK function is determined whether to be received from the SIM card. That is, the command of SET UP MENU corresponding to the STK function and the data packet of the function module corresponding to the STK function are determined whether to be received from the SIM card. When the command of SET UP MENU corresponding to the STK function is received, the data packet corresponding to the STK function module sent by the SIM card is loaded and the menu corresponding to the STK function is displayed.

Alternatively, when the preset command corresponding to the preset function is received from the SIM card, an operation for loading the function module corresponding to the preset function may include: the function module corresponding to the preset function is loaded, and the menu corresponding to the preset function is displayed. The data packet of the function module packet is loaded, such that the corresponding displayed menu is obtained.

Alternatively, when no preset command corresponding to the preset function is received from the SIM card, the function module corresponding to the preset function may not be loaded.

In an embodiment, after the determination in the operation of block S20 that no preset command corresponding to the preset function is received from the SIM card, the system may not be triggered to load the function module corresponding to the preset function. When the preset command corresponding to the preset function from the SIM card is determined not to be received according to the operation of block S20, and when a user manually triggers the operation of loading the function module corresponding to the preset function, that is, when a command based on the presence of the user will intervenes in the process, the command triggered by the user has a higher priority.

According to the scheme described above, the function module corresponding to the unsupported preset function may be automatically uninstalled efficiently, the menu corresponding to the preset function may be well controlled, a memory space is saved and a good user experience is achieved.

Alternatively, in an embodiment, when a plurality of SIM cards are in use in the system, a priority level is configured for all the SIM cards in the system, and the priority level may be configured automatically, or configured by the users according to their needs at the time of use.

In an embodiment, when a plurality of SIM cards are in use in the system and after the default function module corresponding to the preset function in the system is uninstalled, the determination of whether the preset command corresponding to the preset function sent from the plurality of the SIM cards in the system is received, is performed in order of priority according to the configured priority. When the preset command corresponding to the preset function sent from a SIM card with the higher priority, the determination for the other SIM cards may be stopped, the function module corresponding to the preset function may be loaded, and the menu may be displayed.

In another embodiment, when the plurality of the SIM cards are in use in the system, the priority is configured for all the SIM cards in the system. Only when no preset command corresponding to the preset function is received after the determination for all the SIM cards is performed, the function module corresponding to the preset function is not loaded.

Alternatively, when the plurality of the SIM cards are in use in the system and the SIM cards all send the preset command corresponding to the preset function, in the process of loading the function module corresponding to the preset function, the data packet sent from the SIM card with the higher priority is loaded. The priority may also be adjusted to the needs of the user.

Figure 2:
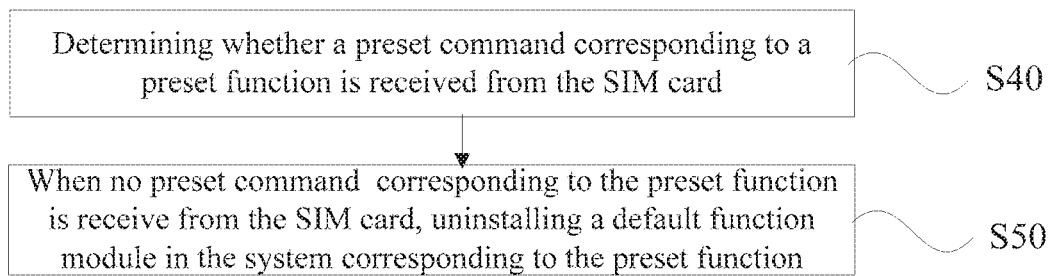
FIG. 2 is a flow schematic view of a method for controlling the display of the SIM card function menu according to another embodiment of the present disclosure.

Referring to FIG. 2, FIG. 2 is a flow schematic view of a method for controlling the display of the SIM card function menu according to another embodiment of the present disclosure.

The method includes block S40: whether the preset command from the SIM card corresponding to the preset function is received, is determined.

Alternatively, whether the preset command corresponding to the preset function is received from the SIM card, is determined. Wherein the preset command may be an active command sent from the SIM card.

In an embodiment, an operation of the determination of whether the preset command from the SIM card corresponding to the preset function is received, is determining whether the active command is received from the SIM card, wherein the active command corresponds to the preset function and has a menu of corresponding operations.

Alternatively, in an embodiment, the determination of whether the preset command corresponding to the preset function is received from the SIM card may be directly performed, or may be performed according to commands received by other methods. That is, the determination of whether the preset command corresponding to the preset function is received from the SIM card, may be indirectly performed by other commands.

At block S50: When no preset command corresponding to the preset function is received from the SIM card, the default function module corresponding to the preset function is uninstalled.

Alternatively, in an embodiment, when no preset command is received from the SIM card corresponding to the preset function, that is, when the SIM card does not support the preset function, the default function module corresponding to the preset function may be uninstalled. Wherein, the default function module refers to a collection of program elements such as data descriptions and executable statements, being configured to achieve the preset function. The default function module may be stored in a terminal system and correspond to the preset function by default.

Alternatively, the preset command corresponding to the preset function is a command that the SIM card actively sends after the system is started, and the preset function is a function corresponding to the active command with the corresponding menu. Wherein, the function module in the SIM card corresponds to the preset function module.

In an embodiment, the preset function may include the STK function, and the active command corresponding to the STK function may include the SET UP MENU.

Alternatively, in an embodiment, when the preset command corresponding to the preset function is not received from the SIM card in the operation of block S40, the preset function is determined to be unsupported by the SIM card, and the default function module corresponding to the preset function is triggered to be uninstalled.

In another embodiment, when the SIM card is determined not to support the corresponding preset command indirectly by other means or commands, the default function module corresponding to the preset function is triggered to be uninstalled at the same time, and the unsupported function module and the corresponding menu are uninstalled.

Alternatively, in an embodiment, when the preset command corresponding to the preset function is received from the SIM card, the function module in the SIM card corresponding to the preset function is loaded. When the preset command corresponding to the preset function is received from the SIM card, the function module in the SIM card corresponding to the preset function may be loaded according to the preset. When the function module in the SIM card corresponding to the preset function is loaded, the existing function module in the system corresponding to the preset function may be directly overwritten. The function module from the SIM card is a collection of program elements such as data descriptions and executable statements, being configured to achieve the preset function and solidified in the SIM card.

Alternatively, in another embodiment, when the preset command corresponding to the preset function is received from the SIM card, the default function module in the system corresponding to the preset function may be loaded according to the preset. In response to the function module corresponding to the preset function in the system being successfully loaded, the menu corresponding to the preset function is displayed. In response to the function module corresponding to the preset function in the system being failed to be loaded, the function module corresponding to the preset function in the SIM card may be automatically loaded, or the data packet of the function module corresponding to the preset function in the SIM card may be automatically obtained, and the function module unable to be loaded is overwritten. The specific needs of the operation are in accordance with the preset provisions and are not limited here.

Referring further to FIGS. 1 and 2, alternatively, in an embodiment, when the system supports the plurality of the SIM cards, since only one data interface is configured, the priority may be configured for the plurality of the SIM cards or manually set by the user.

In an embodiment, when the system supports two SIM cards from different operators, one of the SIM cards is set to have the higher priority. Based on the technical scheme according to the present disclosure, the determination of whether the preset command with the higher priority is received from the SIM card, is performed. When the preset command corresponding to the preset function is determined to be sent from the SIM card with the higher priority, the determination of the SIM card with the lower priority is stopped. A next operation is then automatically performed, that is, the function module corresponding to the preset function is loaded.

In another embodiment, when the system supports the plurality of the SIM cards, the determination of whether the preset command corresponding to the preset function sent from the plurality of the SIM cards in the system is received, is performed in order of priority according to the configured priority. Only when the determination is completed for all the SIM cards in the system and none of the SIM cards send the preset command, the function module corresponding to the preset function is triggered to be uninstalled.

Figure 3:
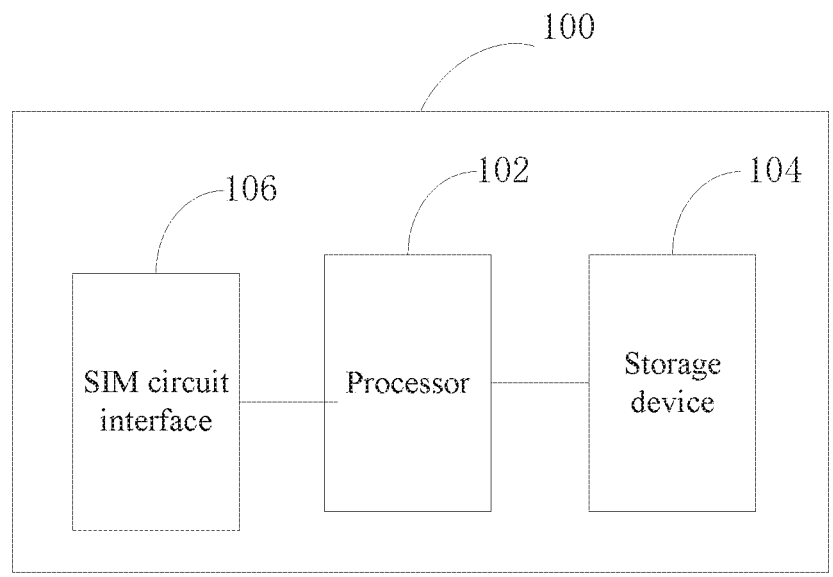
FIG. 3 is a structural schematic view of a terminal according to an embodiment of the present disclosure.

Referring to FIG. 3, FIG. 3 is a structural schematic view of a terminal 100 according to the present disclosure.

Alternatively, the terminal 100 according to the present disclosure may include a memory 104 and a SIM interface circuit 106 electrically connected to a processor 102, respectively, the processor 102 executing the method for controlling the display of the SIM card function menu as described above during the operation, the memory 104 storing a result of the execution of the processor 102 and the method for controlling the display of the SIM card function menu as described above, the SIM interface circuit 106 being configured to achieve the transmission and communication of the data between the SIM card and the processor 102. The SIM interface circuit 106 may be a bridge or a medium for the information interaction between the processor 102 and an external device.

In an embodiment, the terminal 100 may be a mobile phone or a wearable device having communication and networking functions, but is not limited to that.

Figure 4:
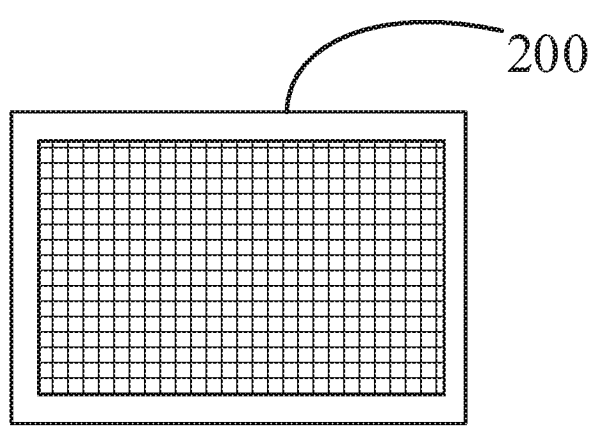
FIG. 4 is a structural schematic view of a device having a storage function according to an embodiment of the present disclosure.

Referring to FIG. 4, FIG. 4 is a device 200 having a storage function according to the present disclosure. The storage device 200 stores the program data, and the method for controlling the display of the SIM card function menu is achieved when the program data is executed. The device 200 may be one of a memory of a terminal device, a personal computer, a server, a network device, or a flash drive.

According to the scheme described above, the default function module of the corresponding SIM card is uninstalled, such that the function module no longer exists in the system memory, when the SIM card does not support or the system does not support the function module, effectively reducing the waste of memory space and improving the user experience.

Any equivalent structure or equivalent process transformation made by using the contents of this application and the accompanying drawings, or applied directly or indirectly in other related fields of technology, is equally covered by the patent protection of this application.

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. A method for controlling a display of a SIM card function menu, comprising:
   uninstalling a default function module in a system corresponding to a preset function;
   determining whether a preset command corresponding to a preset function is received from a SIM card;
   loading a function module in the SIM card corresponding to the preset function and displaying a menu corresponding to the preset function, in response to the preset command corresponding to the preset function being received from the SIM card;
   not loading the function module corresponding to the preset function, in response to no preset command corresponding to the preset function being received from the SIM card;
   wherein in response to the system comprising a plurality of the SIM cards, before the determining whether the preset command corresponding to the preset function is received from the SIM card, the method further comprises:
   configuring a priority level for the plurality of the SIM cards;
   the determining whether the preset command corresponding to the preset function is received from the SIM card further comprises:
   determining whether the preset command corresponding to the preset function is received from the plurality of the SIM cards, in order of the configured priority.

2. The method for controlling the display of the SIM card function menu according to claim 1, wherein the preset command is an active command from the SIM card; the preset function corresponds to the active command.

3. The method for controlling the display of the SIM card function menu according to claim 1, wherein, the uninstalling the default function module corresponding to the preset function comprises:
   the uninstalling the default function module corresponding to the preset function immediately after the system is started.

4. The method for controlling the display of the SIM card function menu according to claim 1, wherein the loading the function module in the SIMS card corresponding to the preset function and the displaying the menu corresponding to the preset function, in response to the preset command corresponding to the preset function being received from the SIM card further comprises:
   stopping the determining of the preset command corresponding to the preset function from the other SIM cards, loading the function module corresponding to the preset function in a higher priority SIM card, and the displaying the menu corresponding to the preset function, in response to a reception of the preset command corresponding to the preset function from the higher priority SIM card;
   not loading the function module corresponding to the preset function, in response to no preset command corresponding to the preset function being received from the SIM card comprises:
   the not loading the function module corresponding to the preset function, in response to no preset command corresponding to the preset function being received from the plurality of the SIM cards.

5. A device having a storage function, wherein the storage device stores a program data and the program data is executed to achieve a method for controlling a display of a SIM card function menu, the method comprising:
   uninstalling a default function module in a system corresponding to a preset function;
   determining whether a preset command corresponding to the preset function is received from a SIM card;
   loading a function module in the SIM card corresponding to the preset function and displaying a menu corresponding to the preset function, in response to the preset command corresponding to the preset function being received from the SIM card;

not loading the function module corresponding to the preset function, in response to no preset command corresponding to the preset function being received from the SIM card;

wherein in response to the system including a plurality of the SIM cards, before the determining whether the preset command corresponding to the preset function is received from the SIM cards, the method further comprises: configuring a priority level for the plurality of the SIM cards; the determining whether the preset command corresponding to the preset function is received from the SIM card comprises:

the determining whether the preset command corresponding to the preset function is received from the plurality of the SIM cards, in order of the configured priority.

6. The device according to claim 5, wherein the preset command is an active command from the SIM card; the preset function corresponds to the active command.

7. The device according to claim 5, wherein the loading the function module in the SIM card corresponding to the preset function and the displaying the menu corresponding to the preset function, in response to the preset command corresponding to the preset function being received from the SIM card comprise:

stopping the determining of the preset command corresponding to the preset function from the other SIM cards, the loading the function module corresponding to the preset function in a higher priority SIM card, and the displaying the menu corresponding to the preset function, in response to a reception of the preset command corresponding to the preset function from the higher priority SIM card;

not loading the function module corresponding to the preset function, in response to no preset command corresponding to the preset function being not received from the SIM card comprises:

the not loading the function module corresponding to the preset function, in response to no preset command corresponding to the preset function being received from the plurality of the SIM cards.

8. The device according to claim 5, wherein the uninstalling the default function module in the system corresponding to the preset function comprises:

the uninstalling the default function module corresponding to the preset function immediately after the system is started.

* * * * *